United States Patent
Tan et al.

(10) Patent No.: US 9,904,809 B2
(45) Date of Patent: Feb. 27, 2018

(54) METHOD AND SYSTEM FOR MULTI-LEVEL SECURITY INITIALIZATION AND CONFIGURATION

(75) Inventors: Shee-Yen Tan, Walnut, CA (US);
Xuemin Chen, San Diego, CA (US);
Iue-Shuenn Chen, San Diego, CA (US); Qiang Ye, Tustin, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 1998 days.

(21) Appl. No.: 11/682,544

(22) Filed: Mar. 6, 2007

(65) Prior Publication Data

US 2007/0294745 A1 Dec. 20, 2007

Related U.S. Application Data

(63) Continuation-in-part of application No. 11/362,696, filed on Feb. 27, 2006.
(Continued)

(51) Int. Cl.
*G06F 21/00* (2013.01)
*G06F 21/85* (2013.01)
(Continued)

(52) U.S. Cl.
CPC ............. *G06F 21/85* (2013.01); *G06F 21/74* (2013.01); *H04N 21/4623* (2013.01); *H04N 21/4751* (2013.01)

(58) Field of Classification Search
CPC .. G06F 21/00; G06F 21/02; G06F 2221/2113; G06F 21/57; G06F 12/1433; G06F 21/34; G06F 21/74
(Continued)

(56) References Cited

U.S. PATENT DOCUMENTS 5,014,191 A 5/1991 Padgaonkar et al.
5,206,714 A 4/1993 Kim
(Continued)

FOREIGN PATENT DOCUMENTS

EP 1 612 684 A1 1/2006
EP 1 612 684 B1 9/2009
(Continued)

OTHER PUBLICATIONS

Definition of 'computer code', from the Free Online Dictionary at http://www.thefreedictionary.com/computer-code, Jul. 1, 2013, 2 pages.
(Continued)

*Primary Examiner* — Alexander Lagor
(74) *Attorney, Agent, or Firm* — Sterne, Kessler, Goldstein & Fox P.L.L.C.

(57) ABSTRACT

Aspects of a method and system for multi-level security initialization and configuration are provided. A security system may comprise a security processor, a host processor, and at least one security component, such as a descrambler. The security processor may enable a security component based on information stored within a non-volatile memory integrated within the security processor. The host processor may enable generation of at least one configuration command communicated to the security processor for configuring the enabled security component. The configuration command may correspond to a security control operational mode for the security component that may indicate, for example, activation or deactivation of the security component. The security processor may authenticate a digital signature in the configuration command. Initialization and configuration may be performed during a system boot sequence of the security system.

21 Claims, 6 Drawing Sheets

Related U.S. Application Data

(60) Provisional application No. 60/814,840, filed on Jun. 19, 2006.

(51) Int. Cl.
  *G06F 21/74* (2013.01)
  *H04N 21/4623* (2011.01)
  *H04N 21/475* (2011.01)

(58) Field of Classification Search
  USPC .................. 726/2, 16–17, 21, 26–27, 34
  See application file for complete search history.

(56) References Cited

U.S. PATENT DOCUMENTS

| | | | |
|---|---|---|---|
| 5,319,705 A | 6/1994 | Halter et al. | |
| 5,530,749 A | 6/1996 | Easter | |
| 5,557,743 A | 9/1996 | Pombo et al. | |
| 5,623,637 A | 4/1997 | Jones et al. | |
| 5,771,287 A | 6/1998 | Gilley et al. | |
| 5,832,207 A | 11/1998 | Little et al. | |
| 5,933,087 A | 8/1999 | Wright | |
| 6,028,937 A | 2/2000 | Tatebayashi et al. | |
| 6,038,563 A | 3/2000 | Bapat et al. | |
| 6,182,089 B1 | 1/2001 | Ganapathy et al. | |
| 6,279,063 B1 | 8/2001 | Kawasaki et al. | |
| 6,317,849 B1 | 11/2001 | Patel | |
| 6,381,747 B1 | 4/2002 | Wonfor et al. | |
| 6,434,077 B1 | 8/2002 | Holmes | |
| 6,466,048 B1 | 10/2002 | Goodman | |
| 6,586,968 B1 | 7/2003 | Schauer et al. | |
| 6,686,768 B2 | 2/2004 | Comer | |
| 6,785,721 B1 | 8/2004 | Immerman et al. | |
| 6,850,252 B1 | 2/2005 | Hoffberg | |
| 6,880,005 B1 | 4/2005 | Bell et al. | |
| 6,880,113 B2 | 4/2005 | Anderson et al. | |
| 6,948,183 B1 | 9/2005 | Peterka | |
| 6,950,818 B2 | 9/2005 | Dennis et al. | |
| 6,970,462 B1 | 11/2005 | McRae | |
| 6,992,945 B2 | 1/2006 | Otsuka | |
| 7,147,558 B2 | 12/2006 | Giobbi | |
| 7,167,077 B2 | 1/2007 | Grassl | |
| 7,176,791 B2 | 2/2007 | Sakai et al. | |
| 7,227,842 B1 | 6/2007 | Ji et al. | |
| 7,236,493 B1 | 6/2007 | McRae | |
| 7,263,367 B1 | 8/2007 | Sabot | |
| 7,317,723 B1 | 1/2008 | Guru | |
| 7,340,469 B1 | 3/2008 | Alghathbar et al. | |
| 7,350,204 B2 | 3/2008 | Lambert et al. | |
| 7,409,707 B2 | 8/2008 | Swander et al. | |
| 7,444,682 B2 | 10/2008 | Li et al. | |
| 7,445,148 B2 | 11/2008 | Uchida et al. | |
| 7,484,237 B2 | 1/2009 | Joly et al. | |
| 7,487,424 B2 | 2/2009 | Nam et al. | |
| 7,489,779 B2 | 2/2009 | Scheuermann | |
| 7,490,333 B2 | 2/2009 | Grimaud et al. | |
| 7,509,673 B2 | 3/2009 | Lin et al. | |
| 7,518,605 B2 | 4/2009 | Lin et al. | |
| 7,549,159 B2 | 6/2009 | Shay | |
| 7,565,553 B2 | 7/2009 | Hunter et al. | |
| 7,590,860 B2 * | 9/2009 | Leporini et al. | 713/185 |
| 7,624,424 B2 | 11/2009 | Morita et al. | |
| 7,647,329 B1 | 1/2010 | Fischman et al. | |
| 7,844,996 B2 | 11/2010 | Chen et al. | |
| 7,913,289 B2 | 3/2011 | Chen et al. | |
| 8,347,357 B2 | 1/2013 | Chen et al. | |
| 9,177,176 B2 | 11/2015 | Chen | |
| 9,489,318 B2 | 11/2016 | Chen | |
| 2002/0059623 A1 * | 5/2002 | Rodriguez et al. | 725/91 |
| 2002/0099952 A1 | 7/2002 | Lambert et al. | |
| 2002/0138749 A1 * | 9/2002 | Koguchi et al. | 713/191 |
| 2002/0184512 A1 | 12/2002 | Cardoso, Jr. | |
| 2003/0041267 A1 | 2/2003 | Fee et al. | |
| 2003/0065982 A1 | 4/2003 | Grimaud et al. | |
| 2003/0070091 A1 | 4/2003 | Loveland | |
| 2003/0081784 A1 | 5/2003 | Kallahalla et al. | |
| 2003/0088786 A1 | 5/2003 | Moran et al. | |
| 2003/0115417 A1 | 6/2003 | Corrigan | |
| 2003/0140245 A1 | 7/2003 | Dahan et al. | |
| 2003/0217322 A1 | 11/2003 | Rodgers | |
| 2003/0221030 A1 | 11/2003 | Pontius et al. | |
| 2003/0226029 A1 * | 12/2003 | Porter et al. | 713/200 |
| 2004/0086127 A1 * | 5/2004 | Candelore | 380/281 |
| 2004/0170068 A1 | 9/2004 | Williams | |
| 2004/0190558 A1 | 9/2004 | Delton | |
| 2004/0250131 A1 | 12/2004 | Swander et al. | |
| 2005/0010765 A1 | 1/2005 | Swander et al. | |
| 2005/0021980 A1 | 1/2005 | Kanai | |
| 2005/0022010 A1 | 1/2005 | Swander et al. | |
| 2005/0114616 A1 | 5/2005 | Tune et al. | |
| 2005/0144475 A1 | 6/2005 | Sakaki et al. | |
| 2005/0213766 A1 | 9/2005 | Goss | |
| 2005/0234907 A1 | 10/2005 | Yamagishi et al. | |
| 2005/0242924 A1 | 11/2005 | Yosim et al. | |
| 2005/0262132 A1 | 11/2005 | Morita et al. | |
| 2005/0262569 A1 | 11/2005 | Shay | |
| 2005/0262570 A1 | 11/2005 | Shay | |
| 2005/0268342 A1 | 12/2005 | Shay | |
| 2005/0278483 A1 | 12/2005 | Andruszkiewicz et al. | |
| 2006/0004536 A1 | 1/2006 | Diamond | |
| 2006/0015947 A1 | 1/2006 | Conti et al. | |
| 2006/0031685 A1 * | 2/2006 | Chen et al. | 713/190 |
| 2006/0044861 A1 | 3/2006 | Smith et al. | |
| 2006/0075508 A1 | 4/2006 | Guo et al. | |
| 2006/0090084 A1 | 4/2006 | Buer | |
| 2006/0145291 A1 | 7/2006 | Badami et al. | |
| 2006/0149958 A1 | 7/2006 | Omathuna | |
| 2006/0161829 A1 | 7/2006 | Kobayashi | |
| 2006/0236408 A1 | 10/2006 | Van | |
| 2006/0265733 A1 | 11/2006 | Chen et al. | |
| 2006/0265734 A1 | 11/2006 | Chen et al. | |
| 2006/0272027 A1 | 11/2006 | Noble | |
| 2006/0294575 A1 | 12/2006 | Rogers | |
| 2007/0157000 A1 | 7/2007 | Qawami et al. | |
| 2007/0169173 A1 * | 7/2007 | Brown et al. | 726/2 |
| 2007/0176761 A1 | 8/2007 | Friedrich | |
| 2007/0192839 A1 | 8/2007 | Fee et al. | |
| 2007/0209072 A1 * | 9/2007 | Chen | 726/16 |
| 2007/0290715 A1 | 12/2007 | Baer et al. | |
| 2007/0294497 A1 | 12/2007 | Chen | |
| 2008/0005586 A1 | 1/2008 | Munguia | |
| 2008/0271164 A1 | 10/2008 | Dellow et al. | |
| 2009/0285280 A1 * | 11/2009 | Newberry et al. | 375/240.01 |
| 2009/0313461 A1 | 12/2009 | Klug | |
| 2011/0197069 A9 | 8/2011 | Rodgers et al. | |
| 2016/0055352 A1 | 2/2016 | Chen | |

FOREIGN PATENT DOCUMENTS

| | | |
|---|---|---|
| WO | WO 97/25675 | 7/1997 |
| WO | WO 99/14881 | 3/1999 |

OTHER PUBLICATIONS

EPO Communication pursuant to Article 94(3) EPC, dated Mar. 16, 2010, for European Patent Application No. 06021663.7-2212, 3 pages.

EPO Communication pursuant to Article 94(3) EPC, dated Jul. 23, 2010, for European Patent Application No. 07000798.4 - 1245, 7 pages.

Extended European Search Report, dated Dec. 16, 2008, for European Patent Application No. 06021663.7-2212, 3 pages.

Federal Information Processing Standards Publication. Fips Pub 46-3, Data Encryption Standard (DES), Oct. 25, 1999, 25 pages.

\* cited by examiner

METHOD AND SYSTEM FOR MULTI-LEVEL SECURITY INITIALIZATION AND CONFIGURATION

CROSS-REFERENCE TO RELATED APPLICATIONS/INCORPORATION BY REFERENCE

This application is a continuation-in-part of, and claims priority to U.S. patent application Ser. No. 11/362,696, which was filed on Feb. 27, 2006. This patent application also makes reference to, claims priority to and claims benefit from U.S. Provisional Patent Application Ser. No. 60/814,840 filed on Jun. 19, 2006.

The above stated application is hereby incorporated herein by reference in its entirety.

FIELD OF THE INVENTION

Certain embodiments of the invention relate to security processor systems. More specifically, certain embodiments of the invention relate to a method and system for multi-level security initialization and configuration.

BACKGROUND OF THE INVENTION

In an increasingly security-conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing at least some limited functionality of the system. In some instances, a single device, such as a security processor for example, may be utilized to administer security operations in the multimedia system. The security processor may operate independently of other components in the multimedia system when determining rights or privileges of different users to various features in the multimedia system. For example, vendors may have limited access to some of the functions that may be accessible by the manufacturer. Home users may only have access to a subset of the vendors' access rights. In some instances, secure operations may be managed by specifying, in a single location, secure conditions for each security component supported by the system.

However, there may be several limitations with such a straightforward implementation. On a typical security system, the number of user modes and security components may be sufficiently large that the size of the security management and/or control information may require large amounts of memory. There may be a significant number of access control entries that may correspond to instances when access rights may not be granted and/or instances when the access rights may be the same for multiple user modes and/or for multiple security components, such as default settings, for example. The addition or removal of user modes or security components may pose various implementation challenges, which increases hardware and/or software complexity. As software and/or hardware complexity grows by, for example, increasing the number of secure components in the security system, it may become more challenging to manage security operations without introducing security breaches or other concerns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for multi-level security initialization and configuration, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multi-level security initialization and configuration. Aspects of the invention may comprise a security system that includes a security processor, a host processor, and at least one security component, such as a descrambler. The security processor may enable a security component based on information stored within a non-volatile memory integrated within the security processor. The host processor may enable generation of at least one configuration command communicated to the security processor for configuring the enabled security component. The configuration command may correspond to a security control operational mode for the security component that may indicate, for example, activation or deactivation of the security component. The security processor may authenticate a digital signature in the configuration command. Initialization and configuration may be performed during a system boot sequence of the security system.

Figure 1:
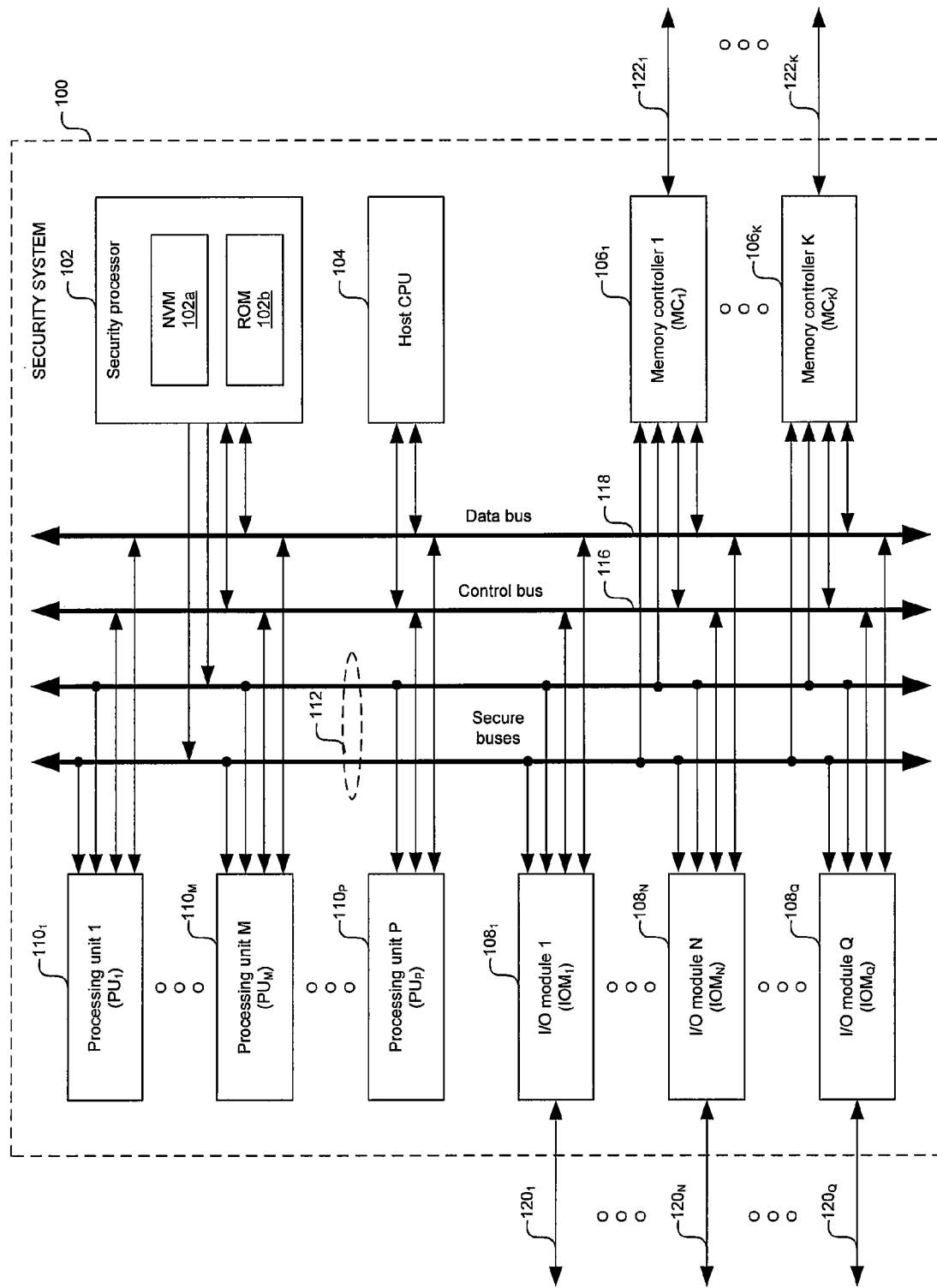
FIG. 1 is a block diagram illustrating an exemplary secure system architecture for multi-level initialization and configuration of security components, in accordance with an embodiment of the invention.

FIG. 1 is a block diagram illustrating an exemplary secure system architecture for multi-level initialization and configuration of security components, in accordance with an embodiment of the invention. Referring to FIG. 1, there is shown a security system 100 that may be implemented as a single integrated chip, for example. In this regard, the security system 100 may be implemented as a system-on-a-chip (SOC) device, for example. The security system 100 may comprise at least one memory controller (MC) 106, at least one input/output (I/O) module (IOM) 108, at least one processing unit (PU) 110, a security processor 102, a host processor or host central processing unit (CPU) 104, at least one secure bus 112, a control bus 116, and a data bus 118. The plurality of MCs 106, the plurality of IOMs 108, and/or the plurality of PUs 110 may be referred to as security components within the security system 100. In the exemplary embodiment described in FIG. 1, the security system 100 is shown comprising a plurality of processing units labeled $PU_1$ $110_1, \ldots, PU_M 110_M, \ldots, PU_P 110_P$, a plurality of I/O modules labeled $IOM_1$ $108_1, \ldots, IOM_N 108_N, \ldots, IOM_Q 108_Q$, and a plurality of memory controllers labeled $MC_1$ $106_1, \ldots, MC_K 106_K$. The bus architecture provided by the security system 100 may enable scalability and may easily support the addition and/or removal of security components.

A memory controller 106 may comprise suitable logic, circuitry, and/or code that may enable accessing data from memory and/or storing data to memory. In this regard, the plurality of memory controllers $MC_1$ $106_1, \ldots, MC_K 106_K$, shown in FIG. 1 may utilize bidirectional interfaces $122_1, \ldots, 122_K$, respectively, to communicate with memory. An example of a memory controller 106 may be a 32-bit double data rate (DDR) memory controller. A processing unit 100 may comprise suitable logic, circuitry, and/or code that may enable processing of multimedia data. For example, a PU 100 may be an MPEG video or audio decoder that may be implemented in hardware as an application specific integrated circuit (ASIC) module or in a program as software/firmware executed in an integrated digital signal processor (DSP). A PU 100 may also be a descrambler that may be utilized for applications that support data encryption standard (DES), triple DES (TDES) or triple data encryption algorithm (TDEA), advanced encryption standard (AES), conditional access (CA) system for digital video broadcasting (DVB), and/or the block cipher MULTI2 that may be used for encryption of high-definition broadcasts, for example.

An I/O module 108 may comprise suitable logic, circuitry, and/or code that may enable communication with devices external to the security system 100. In this regard, the plurality of plurality of I/O modules $IOM_1$ $108_1, \ldots, IOM_N 108_N, \ldots, IOM_Q 108_Q$, described in FIG. 1 may utilize bidirectional interfaces $120_1, \ldots, 120_N, \ldots, 120_Q$, respectively, to communicate with devices external to the security system 100. An example of an I/O module 108 may be a universal serial bus (USB) 2.0 interface. Other examples of I/O modules may comprise modules that support inter-integrated circuit (I2C) interface, serial peripheral interface (SPI) bus, joint test action group (JTAG) standard for testing access ports and boundary scanning, and/or enhanced JTAG (EJTAG), for example.

The security processor 102 may comprise suitable logic, circuitry, and/or code that may enable control, initialization and configuration, and/or management of security operations and/or functionalities in the security system 100. In this regard, the security processor 102 may communicate security information to memory controllers, I/O modules, and/or processing units via the at least one secure bus 112. The security processor 102 may also communicate with the host processor 104 via at least one of the control bus 116 and the data bus 118. In some instances, the security processor 102 may be disabled and the security system 100 may be operated as a multimedia device with minimum security features controlled by the host processor 104. The security processor 102 may also comprise a non-volatile memory (NVM) 102a and/or a read-only memory (ROM) 102b. The NVM 102a may comprise suitable logic, circuitry, and/or code that may be utilized to store information that may be utilized for initialization and configuration of security components in the security system 100. Similarly, the ROM 102b may comprise suitable logic, circuitry, and/or code that may be utilized to store information that may be utilized for initialization and configuration of security components in the security system 100.

The host CPU 104 may comprise suitable logic, circuitry, and/or code that may enable control and/or management of operations in the security system 100. In this regard, the host CPU 104 may be utilized for initialization and configuration of security components in the security system 100, such as memory controllers, I/O modules, and/or processing units, for example. The host CPU 104 may communicate with other components in the security system 100 via at least one of the control bus 116 and the data bus 118. In this regard, the host CPU 104 may communicate with the security processor 102 via the control bus 116 and the data bus 118.

The data bus 118 may be utilized for multimedia data transfer between components in the security system 100. The control bus 116 may be utilized for control and initialization and configuration data transfer. For example, the control bus 116 may be utilized to read and/or write to registers. The secure buses 112 may be utilized for security control and configuration data transfer. For example, the secure buses 112 may be utilized to read and/or write to secure registers. In this regard, the secure buses 112 may be communicatively coupled to components of the security system 100 that may require secure registers and/or secure data access. The secure buses 112 may also be utilized for delivery of encryption and/or decryption keys to functional units that require keys for cryptographic operations, such as block cipher operations, for example. For example, the processing unit $PU_P$ $100_P$ in FIG. 1 may not utilize encryption and/or decryption keys and need not be connected to a secure bus 112 utilized for key delivery.

The bus architecture of the security system 100 need not be limited to the exemplary architecture disclosed in FIG. 1. For example, a portion of the at least one secure bus 112 may be implemented as a secure part or band of the control bus 116. A secure part or band may refer to a portion of the control bus 116 that may be utilized for communicating secure control information, for example. In another example, the functions provided by the data bus 118 may be implemented by a plurality of data buses based on the different types of data being processed in the security system 100, wherein the plurality of data buses may be connected via bus bridges.

The security system 100 may enable multiple levels for the initialization and configuration of the security components. In this regard, in an exemplary embodiment of the invention, the security system 100 may utilize three discrete security control states for each security system component. The three discrete security control states may correspond to the security component being enabled or disabled, active or inactive, and owned or unowned. The use of three discrete security control states may result in eight possible security control operational modes for each component in the security system 100. Providing any of the eight possible security control operational modes may be achieved, at least in part, by programming the corresponding information in the NVM 102*a* and/or the ROM 102*b* in the security processor 102. The security processor 102 and/or the host CPU may be utilized for performing initialization and configuration operations to provide security components with the three discrete security control states that correspond to the appropriate security control operational mode.

Figure 2A:
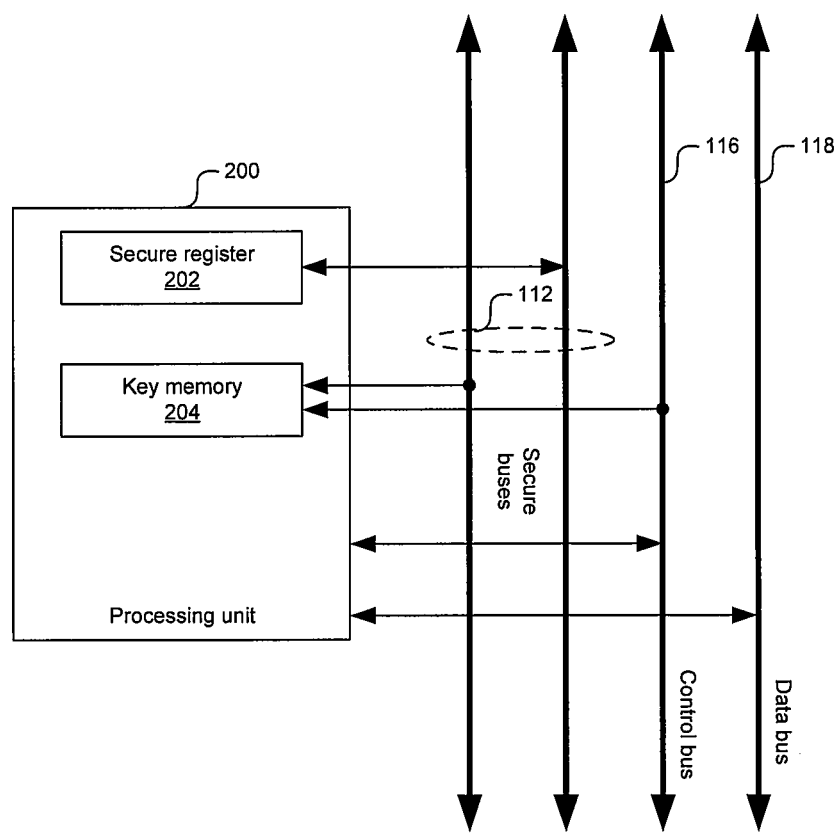
FIG. 2A is a block diagram illustrating an exemplary processing unit as a security component in a secure system architecture architecture, in accordance with an embodiment of the invention.

FIG. 2A is a block diagram illustrating an exemplary processing unit as a security component in a secure system architecture, in accordance with an embodiment of the invention. Referring to FIG. 2A, there is shown a processing unit 200 that may comprise a secure register 202 and a key memory 204. The processing unit 200 may comprise suitable logic, circuitry, and/or code that may enable execution of multimedia applications that may require encryption and/or decryption operations. The encryption and/or decryption operations may be based on the DES, TDES, AES, encryption techniques for DVB, and/or MULTI2 for high-definition broadcasts, for example. In this regard, the processing unit 200 may be a descrambler that supports at least one scrambling or encryption technology. General configuration and/or control information to be utilized and/or generated by the processing unit 200 may be communicated via the control bus 116. General data to be utilized and/or generated by the processing unit 200 may be communicated via the data bus 118. Moreover, secure initialization and configuration operations provided by the security processor 102 may be communicated via the at least one secure bus 112.

The secure register 202 may comprise suitable logic, circuitry, and/or code that may enable communicating information with the security processor 102 via the at least one secure bus 112. In this regard, the secure register 202 may only be read and/or be written by the security processor 102. The secure register 202 may be implemented as a single register or as set of registers, for example. The secure register 202 may be specified based initialization and configuration operations and/or functionalities of the processing unit 200. For example, at least one bit in the security register 202 may be utilized for enabling and/or disabling control of security functions in the processing unit 200. At least one bit in the security register 202 may be utilized for activating and/or deactivating control of security functions in the processing unit 200. At least one bit in the security register 202 may be utilized for controlling a mode of operation of the processing unit 200. The mode of operation may indicate an input and/or output data routing, allowing and/or disallowing key loading by the security processor 102 and/or the host processor 104, and/or selection of a security algorithm, for example. The key memory 204 may comprise suitable logic, circuitry, and/or code that may enable storing decryption and/or encryption keys communicated from the security processor 102 via the at least one secure bus 112 and/or from the host CPU 104 via the control bus 116. In this regard, the key memory 204 may be implemented utilizing a write-only random access memory (RAM), for example.

Figure 2B:
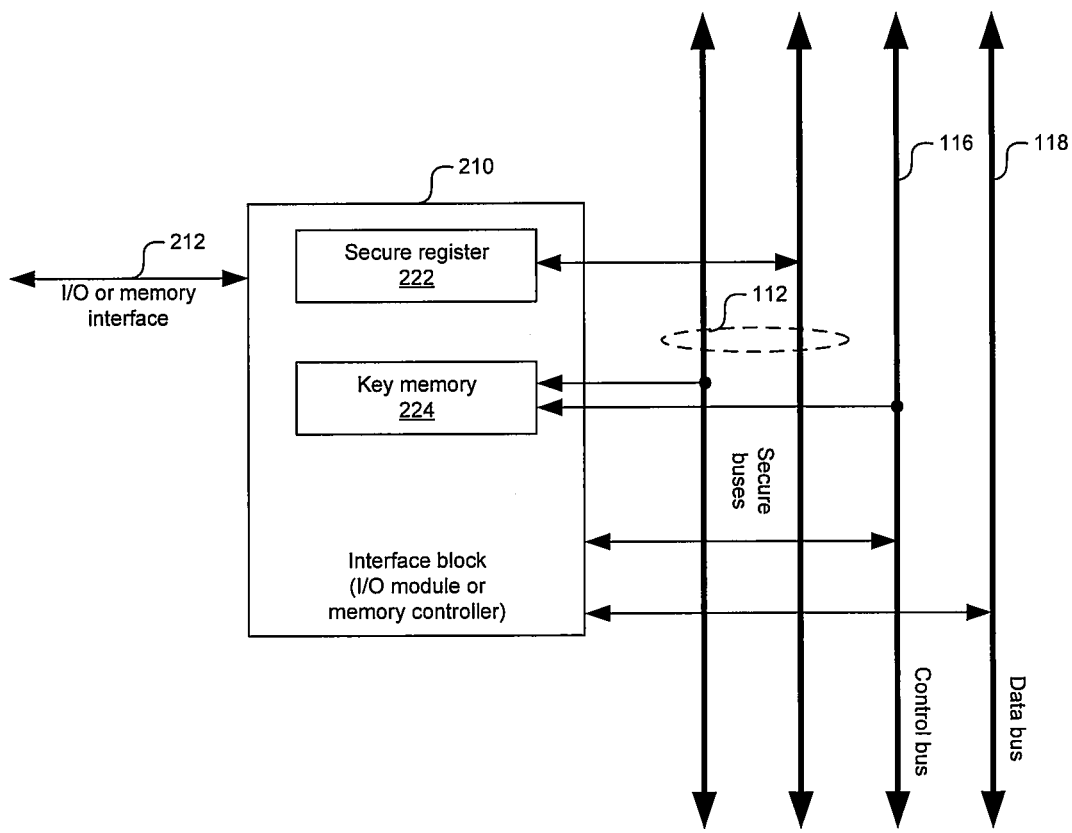
FIG. 2B is a block diagram illustrating an exemplary I/O module or memory controller as a security component in a secure system architecture, in accordance with an embodiment of the invention.

FIG. 2B is a block diagram illustrating an exemplary I/O module or memory controller as a security component in a secure system architecture, in accordance with an embodiment of the invention. Referring to FIG. 2B, there is shown an interface block 210 that may comprise a secure register 222 and a key memory 224. The interface block 210 may correspond to an I/O module 108 or a memory controller 106 as disclosed in FIG. 1. The interface block 210 may comprise suitable logic, circuitry, and/or code that may enable communication with devices external to the security system 100 via the interface 212. In this regard, the interface block 210 may perform secure operations on at least a portion of the communicated data. For example, the interface block 210 may enable high bandwidth digital content protection (HDCP) and may utilize a key protection mechanism for secure interfaces to digital displays, such as digital visual interface (DVI) and high definition multimedia interface (HDMI), for example. The interface block 210 may also support I2C interface, SPI bus, JTAG, and/or EJTAG, for example. General configuration and/or control information to be utilized and/or generated by the interface block 210 may be communicated via the control bus 116. Data to be utilized and/or generated by the interface block 210 may be communicated via the data bus 118. Moreover, secure initialization and configuration operations provided by the security processor 102 may be communicated via the at least one secure bus 112.

The secure register 222 and the key memory 224 in the interface block 210 may be the same as or substantially similar to the secure register 202 and the key memory 204 disclosed in FIG. 2A, respectively. For example, the secure register 222 may only be read and/or be written to by the security processor 102, may be implemented as a single register or as set of registers, and may be specified based on its functionalities. The key memory 224, for example, may store decryption and/or encryption keys communicated from the security processor 102 via the at least one secure bus 112 and/or from the host CPU 104 via the control bus 116, and may be implemented utilizing a write-only RAM, for example.

Figure 3:
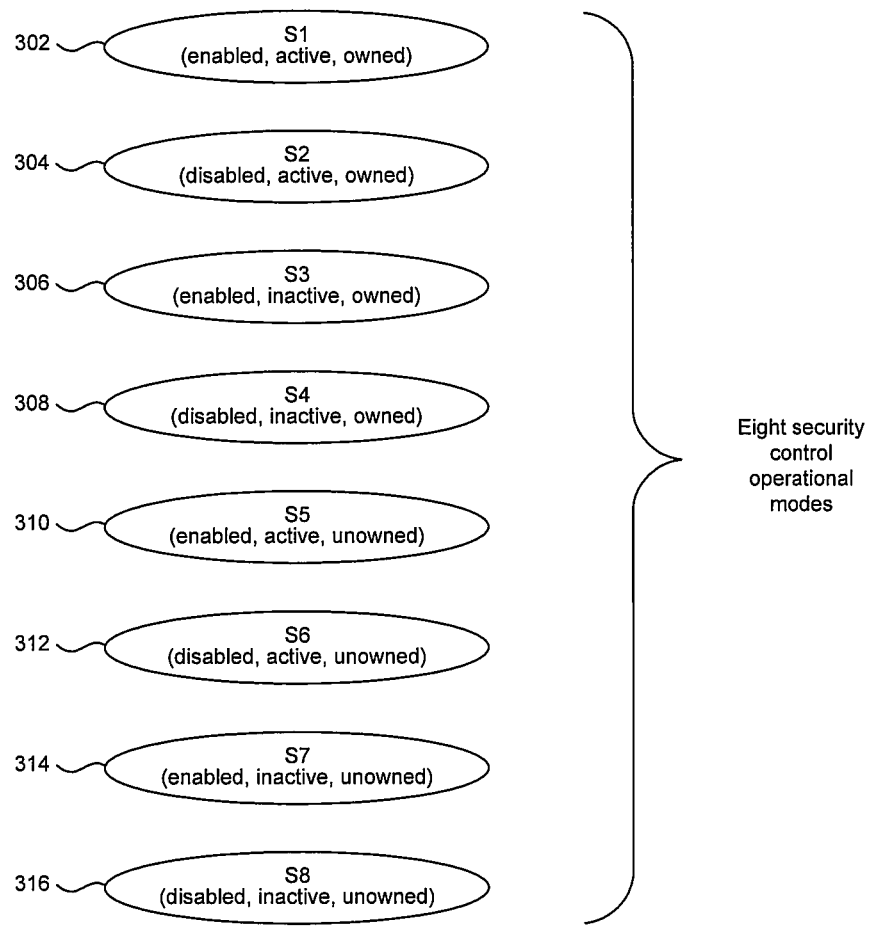
FIG. 3 is a diagram illustrating eight exemplary security control operational modes for security components based on three discrete security control states, in accordance with an embodiment of the invention.

FIG. 3 is a diagram illustrating eight exemplary security control operational modes for security components based on three discrete security control states, in accordance with an embodiment of the invention. Referring to FIG. 3, there are shown eight security control operational modes for security components in the security system 100. The eight security control operational modes may comprise a first mode (S1) 302, a second mode (S2) 304, a third mode (S3) 306, a fourth mode (S4) 308, a fifth mode (S5) 310, a sixth mode (S6) 312, a seventh mode (S7) 314, and an eighth mode (S8) 316. For each mode there are three corresponding discrete security control states. For mode S1, the states may be enabled, active, and owned. For mode S2, the states may be disabled, active, and owned. For mode S3, the states may be enabled, inactive, and owned. For mode S4, the states may be disabled, inactive, and owned. For mode S5, the states may be enabled, active, and unowned. For mode S6, the states may be disabled, active, and unowned. For mode S7, the states may be enabled, inactive, and unowned. For mode S8, the states may be disabled, inactive, and unowned.

Ownership of the security component of a security system may correspond to a first discrete security control state or first level of initialization and configuration. The owner of a security component may be defined as the user who initializes and configures the secret or secure information in the security processor 102, for example. The owner of the security processor 102 may have the highest level of control of the security system 100. The process of taking ownership may be user specific and may be controlled, at least in part, by procedural safeguards implemented in the production process. In this regard, the production process may comprise storing the appropriate information into the NVM 102*a* and/or the ROM 102*b* in the security processor 102.

Enabling or disabling a security component and its features in the security system 100 may correspond to a second discrete security control state or second level of initialization and configuration. In some instances, the security components, such as the plurality of MCs 106, the plurality of IOMs 108, and/or the plurality of PUs 110 disclosed in FIGS. 1-2B, and their corresponding features may be enabled or disabled for specified user modes in order to be compliant with system security requirements. The enabling or disabling process may be enforced by the security processor 102 based on information programmed into the NVM 102*b* and on security processor ROM code, for example.

A final discrete security control state or level of initialization and configuration may occur after ownership has taken place and the security system 100 is ready for operation. In this regard, during a system boot sequence, the security system 100 may be enabled to transition from a power-off state to one where the security system 100 begins the initialization and configuration level for operation. Entering the system boot sequence may be a result of power being applied to the security system 100 or a hard reset operation, for example. The initialization and configuration for operation may comprise activating or deactivating at least one security component in the security system 100. Such activation or deactivation operations may be performed based on at least one configuration command communicated to the security processor 102 from the host CPU 104, for example.

Figure 4:
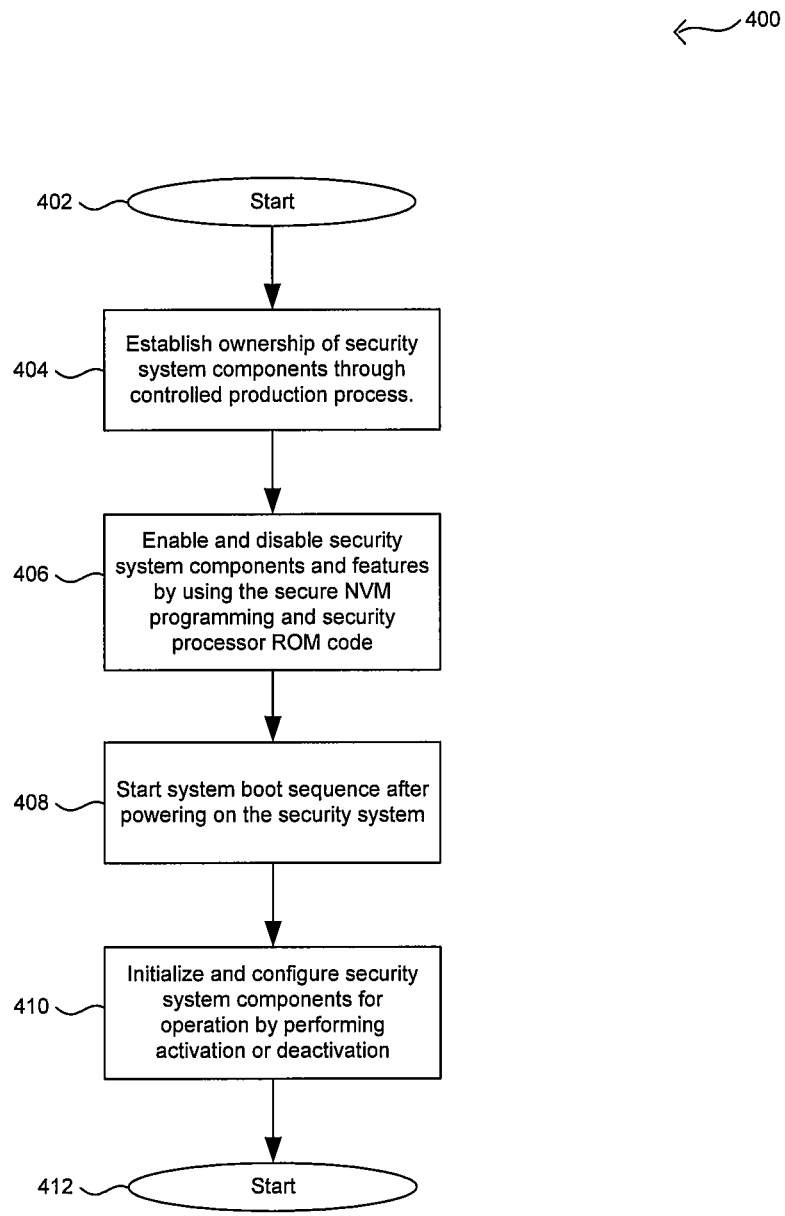
FIG. 4 is a flow diagram illustrating exemplary steps for establishing a security control operational mode in a security component, in accordance with an embodiment of the invention.

FIG. 4 is a flow diagram illustrating exemplary steps for establishing a security control operational mode in a security component, in accordance with an embodiment of the invention. Referring to FIG. 4, there is shown a flow diagram 400 for providing a security control operational mode based on establishing three discrete security control state on a security component. In step 404, after start step 402, the first discrete security control state of ownership may be established based on specifications or requirements determined by the user through a controlled production process that utilizes procedural safeguards. In this regard, the production process may comprise storing the appropriate security information associated with security components in the security system 100 into the NVM 102*a* and/or the ROM 102*b* in the security processor 102.

In step 406, the security processor 102 may provide the second discrete security control state of enabling or disabling security components and/or specified features provided by the security components based on information programmed into the NVM 102*b* and on security processor ROM code. In this regard, the security processor 102 may program information into secure registers and/or key memory within the security components for enabling and/or disabling the components or specified features. For example, for the processing unit 200 in FIG. 2A, the security processor 102 may communicate enabling and/or disabling information via the at least one secure bus 112. In another example, for the interface block 210 in FIG. 2A, the security processor 102 may communicate enabling and/or disabling information via the at least one secure bus 112.

In step 408, the security system 100 may utilize a system boot sequence after powering up or after a hard reset during which additional initialization and configuration operations may occur. In step 410, the initialization and configuration for operation of the security system 100 may provide a third discrete security control state by activation or deactivation of enabled security components and/or features provided by the enabled security components. In this regard, the security processor 102 may program information into secure registers and/or key memory within the security components for activating and/or deactivating the components or specified features. For example, for the processing unit 200 in FIG. 2A, the security processor 102 may communicate activation and/or deactivation information via the at least one secure bus 112. In another example, for the interface block 210 in FIG. 2A, the security processor 102 may communicate activation and/or deactivation information via the at least one secure bus 112. The security processor 102 may perform the activation or deactivation operations based on at least one configuration command communicated from the host CPU 104.

With eight modes available for security control operation, the security components in the security system 100 may be flexible and may accommodate a wide range of usage scenarios. In this regard, each security component in the security system 100 may be provided with one of the eight security control operational modes. For example, a DES descrambler in an owned security system may be enabled via a control bit in the NVM 102*a* in the security processor 102 and may be activated or deactivated, also referred to as inactive, via a configuration command provided by the security processor 102 communicated from the host CPU 104.

Utilizing a configuration command may restrict the usage of certain module or security component by programming registers in the security component or by updating checking mechanisms in the security processor 102. In this regard, the host CPU 104 may not utilize the configuration commands to relax existing restrictions because the system architecture may not enable the use of host software for this purpose. The use of a configuration command may also be applicable to other security features such as features provided by security components for interface security, for example. For example, some bits in the NVM 102*b* may be programmed to enable features and/or security components that support features such as I2C, SPI, JTAG, and/or EJTAG. In this regard, the configuration command may be utilized to set states that restrict these features so that they may be activated after the host CPU 104 passes an authentication test or deactivated for shutdown, for example.

Figure 5:
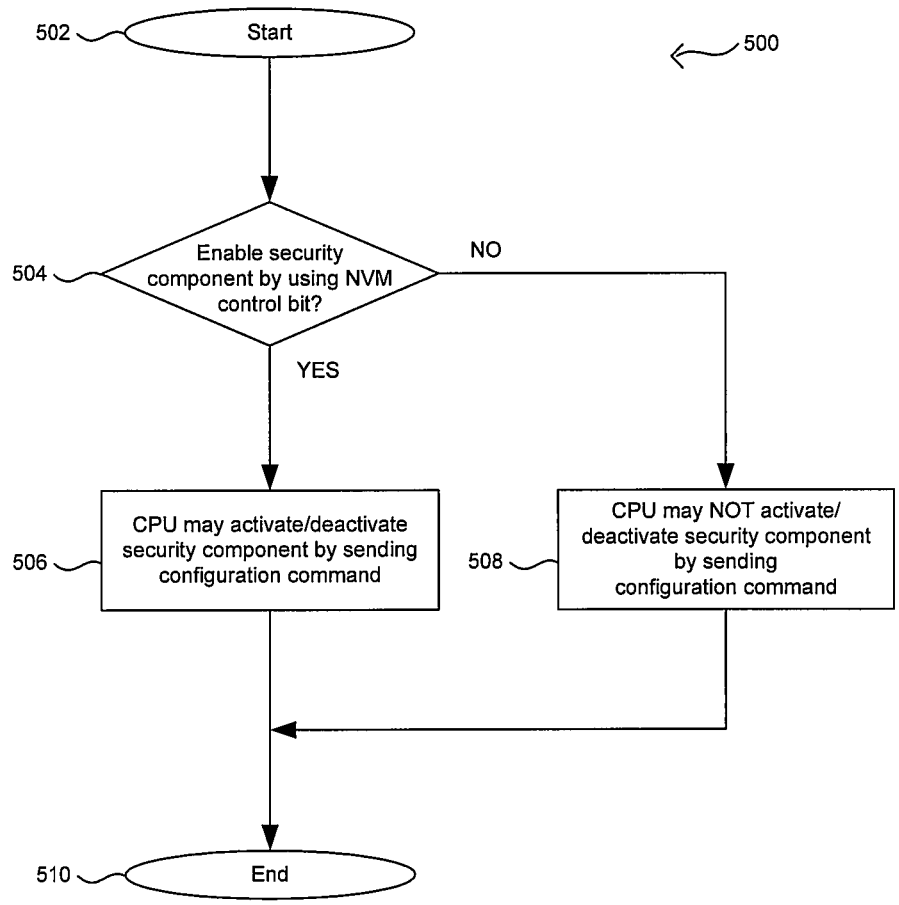
FIG. 5 is a flow diagram illustrating exemplary steps for utilizing a CPU configuration command to activate or deactivate an enabled security component, in accordance with an embodiment of the invention.

FIG. 5 is a flow diagram illustrating exemplary steps for utilizing a CPU configuration command to activate or deactivate an enabled security component, in accordance with an embodiment of the invention. Referring to FIG. 5, there is shown a flow diagram 500. In step 504, after start step 502, based on security requirements for the security system 100, when a bit in the NVM 102*a* is utilized to enable a DVB descrambler in the security system 100, the process may proceed to step 506. In step 506, the host CPU 104 may utilize a configuration command sent to the security processor 102 to activate or deactivate at least a portion of the enabled DVB descrambler. After step 506, the process may proceed to step 510.

Returning to step 504, based on security requirements for the security system 100, when a bit in the NVM 102*a* is utilized to disable a DVB descrambler in the security system 100, the process may proceed to step 508. In step 508, the host CPU 104 may not utilize a configuration command sent to the security processor 102 to activate at least a portion of the disabled DVB descrambler. After step 508, the process may proceed to step 510.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for system initialization, the method comprising:
    enabling a security component in a security system based on a value of an enable bit stored within a non-volatile memory integrated within a security processor in said security system; and
    activating, by said security processor, said security component in response to a configuration command communicated to said security processor by a host processor in said security system if said security component is enabled,
    wherein said host processor is prevented from modifying said enable bit stored within said non-volatile memory to enable said security component.

2. The method according to claim 1, comprising authenticating a digital signature in said configuration command.

3. The method according to claim 1, further comprising deactivating, by said security processor, said security component in response to another configuration command communicated to said security processor by said host processor if said security component is enabled.

4. The method according to claim 1, further comprising enabling said security component during a system boot sequence of said security system.

5. The method according to claim 1, further comprising activating said security component during a system boot sequence of said security system.

6. The method according to claim 1, wherein said security component is a descrambler.

7. A non-transitory computer readable medium having stored thereon, a computer program having at least one code section for system initialization, said at least one code section being executable by a computer for causing said computer to perform steps comprising:
    enabling a security component in a security system based on a value of an enable bit stored within a non-volatile memory integrated within a security processor in said security system; and
    activating, by said security processor, said security component in response to a configuration command communicated to said security processor by a host processor in said security system if said security component is enabled,
    wherein said host processor is prevented from modifying said enable bit stored within said non-volatile memory to enable said security component.

8. The non-transitory computer readable medium according to claim 7, further comprising code for authenticating a digital signature in said configuration command.

9. The non-transitory computer readable medium according to claim 7, further comprising code for deactivating, by said security processor, said security component in response to another configuration command communicated to said security processor by said host processor and if said security component is enabled.

10. The non-transitory computer readable medium according to claim 7, further comprising code for enabling said security component during a system boot sequence of said security system.

11. The non-transitory computer readable medium according to claim 7, further comprising code for activating said security component during a system boot sequence of said security system.

12. The non-transitory computer readable medium according to claim 7, wherein said security component is a descrambler.

13. A system for system initialization, the system comprising:
    a security system comprising a security processor, a host processor, and a security component;
    wherein said security processor is configured to enable said security component based on a value of an enable bit stored within a non-volatile memory integrated within said security processor;
    wherein said host processor is configured to generate a configuration command for communication to said security processor to activate said security component,
    wherein said security processor is configured to activate said security component in response to said configuration command if said security component is enabled, and
    wherein said host processor is prevented from modifying said enable bit stored within said non-volatile memory to enable said security component.

14. The system according to claim 13, wherein said security processor is further configured to authenticate a digital signature in said configuration command.

15. The system according to claim 13, wherein said security processor is further configured to deactivate said security component in response to another configuration command communicated to said security processor by said host processor if said security component is enabled.

16. The system according to claim 13, wherein said security processor is further configured to enable said security component during a system boot sequence of said security system.

17. The system according to claim 13, wherein said security processor is further configured to activate said security component during a system boot sequence of said security system.

18. The system according to claim 13, wherein said security component is a descrambler.

19. A system for system initialization, the system comprising:
 a security processor configured to enable a security component in a security system based on a value of an enable bit stored within a non-volatile memory integrated within said security processor in said security system;
 wherein said security processor configured to activate said security component in response to a configuration command communicated to said security processor by a host processor in said security system if said security component is enabled, and
 wherein said host processor is prevented from modifying said enable bit stored within said non-volatile memory to enable said security component.

20. The system according to claim 19, wherein said security processor is further configured to authenticate a digital signature in said configuration command.

21. The method according to claim 1, wherein enabling said security component in said security system further comprises:
 writing a bit to a register in said security component using a secure bus not accessible to said host processor.

* * * * *